United States Patent
Almarzooq (10) Patent No.: US 10,563,504 B2
(45) Date of Patent: *Feb. 18, 2020

(54) DETERMINING A ROCK FORMATION CONTENT

(71) Applicant: Saudi Arabian Oil Company, Dhahran (SA)

(72) Inventor: Anas Almarzooq, Eastern Province (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,220

(22) Filed: Sep. 14, 2018

(65) Prior Publication Data

US 2019/0017375 A1 Jan. 17, 2019

Related U.S. Application Data

(63) Continuation of application No. 15/450,821, filed on Mar. 6, 2017, now Pat. No. 10,156,137.

(51) Int. Cl.
| | | |
|---|---|---|
| *E21B 49/00* | (2006.01) | |
| *G06Q 50/02* | (2012.01) | |
| *G01V 11/00* | (2006.01) | |

(52) U.S. Cl.
CPC .............. *E21B 49/00* (2013.01); *G01V 11/00* (2013.01); *G06Q 50/02* (2013.01)

(58) Field of Classification Search
CPC ...... E21B 49/00; G01V 11/00; G06Q 10/063; G06Q 50/02
See application file for complete search history.

(56) References Cited

U.S. PATENT DOCUMENTS

| | | | |
|---|---|---|---|
| 4,712,424 | A | 12/1987 | Herron |
| 4,722,220 | A | 2/1988 | Herron |

(Continued)

FOREIGN PATENT DOCUMENTS

| | | |
|---|---|---|
| EP | 2894292 | 7/2015 |
| WO | 2015099563 | 7/2015 |

OTHER PUBLICATIONS

Trostel et al., "Determination of Quartz in Refactory Clays," Journal of the American Ceramic Society, 1939.

(Continued)

*Primary Examiner* — Kyle R Quigley
(74) *Attorney, Agent, or Firm* — Fish & Richardson P.C.

(57) ABSTRACT

Techniques for determining an amount of chert in a rock formation include identifying first logging data for a selected zone of a first subterranean formation that includes chert, quartz, and zircon; identifying second logging data for a second subterranean formation that is different than the first subterranean formation, the second subterranean formation including chert, quartz, and zircon; determining a first volumetric ratio of quartz to zircon in the selected zone based on the first logging data; determining a second volumetric ratio of quartz to zircon based on the second logging data; determining a maximum value of the second volumetric ratio; and calculating, based on the first and second volumetric ratios and the maximum value of the second volumetric ratio, a volumetric percentage of chert in the selected zone.

22 Claims, 7 Drawing Sheets

(56) References Cited

U.S. PATENT DOCUMENTS

| | | | |
|---|---|---|---|
| 4,903,527 A | 2/1990 | Herron | |
| 10,156,137 B2* | 12/2018 | Almarzooq | E21B 49/00 |
| 2007/0246649 A1 | 10/2007 | Jacobi et al. | |
| 2012/0283951 A1 | 11/2012 | Li | |
| 2012/0306257 A1 | 12/2012 | Silversides et al. | |
| 2014/0283609 A1 | 9/2014 | MacLeod et al. | |
| 2015/0322778 A1 | 11/2015 | Kesall | |

OTHER PUBLICATIONS

International Search Report and Written Opinion issued in International Application No. PCT/US2018/019901 dated Jun. 6, 2018, 12 pages.

Gulf Cooperation Council Examination Report issued in GCC Application No. GC 2018-34892 dated Oct. 9, 2019, 4 pages.

* cited by examiner

DETERMINING A ROCK FORMATION CONTENT

This application is a continuation of, and claims priority under 35 U.S.C. § 120 to, U.S. patent application Ser. No. 15/450,821, filed on Mar. 6, 2017, entitled "Determining a Rock Formation Content," the entire contents of which are incorporated by reference herein.

TECHNICAL FIELD

This disclosure relates to determining a content of a rock formation and, more particularly, determining an amount of chert in a rock formation that includes quartz.

BACKGROUND

Chert is a rock that has the same or similar elemental composition to quartz. Thus, conventional logging tools that measure density, neutron, and resistivity may only identify chert as quartz across a subterranean formation rather than chert, itself. Chert, however, relative to many other rocks in hydrocarbon bearing formations, has a high rock strength, and the presence of chert in subterranean formations may add difficulties to drilling and completion operations.

SUMMARY

This disclosure describes implementations of methods and systems for determining an amount of chert in a subterranean formation. In some aspects, the amount of chert is determined according to conventional logs that identify volumetric ratios of quartz (with a similar elemental structure as chert) and zircon within the selected formation, as well as baseline logs from subterranean formations independent of the selected formation and particular zones within the formation (e.g., known hydrocarbon bearing zones).

In an example implementation, techniques for determining an amount of chert in a rock formation include identifying first logging data for a selected zone of a first subterranean formation that includes chert, quartz, and zircon; identifying second logging data for a second subterranean formation that is different than the first subterranean formation, the second subterranean formation including chert, quartz, and zircon; determining a first volumetric ratio of quartz to zircon in the selected zone based on the first logging data; determining a second volumetric ratio of quartz to zircon based on the second logging data; determining a maximum value of the second volumetric ratio; and calculating, based on the first and second volumetric ratios and the maximum value of the second volumetric ratio, a volumetric percentage of chert in the selected zone.

An aspect combinable with the example implementations includes calculating an absolute volume of the chert in the selected zone based on the volumetric percentage of the chert in the selected zone.

In another aspect combinable with any of the previous aspects, calculating the absolute volume of the chert in the selected zone includes determining a total volume of the quartz in the selected zone; and multiplying the volumetric percentage of the chert in the selected zone by the total volume of the quartz in the selected zone.

In another aspect combinable with any of the previous aspects, the first subterranean formation includes a marine deposition subterranean environment, and the second subterranean formation includes a non-marine deposition subterranean environment.

In another aspect combinable with any of the previous aspects, calculating, based on the first and second volumetric ratios and the maximum value of the second volumetric ratio, a volumetric percentage of the chert in the selected zone includes solving the equation $$P_{chert} = \frac{R_{zone} - R_{Baseline}}{R_{max}},$$

where is $P_{chert}$ the volumetric percentage of the chert in the selected zone, $R_{zone}$ is the first volumetric ratio, $R_{Baseline}$ is the second volumetric ratio, and $R_{max}$ is the maximum value of the second volumetric ratio.

In another aspect combinable with any of the previous aspects, the selected zone includes a Qusaiba geological formation.

Another aspect combinable with any of the previous aspects further includes displaying, on a graphical user interface, the calculated volumetric percentage of chert in the selected zone.

In another aspect combinable with any of the previous aspects, displaying the calculated volumetric percentage of chert in the selected zone includes displaying the calculated volumetric percentage of chert as a function of depth between a shallowest depth of the selected zone and a deepest depth of the selected zone.

Another aspect combinable with any of the previous aspects further includes recommending an adjustment to a drilling or completion operation based at least in part on the calculated volumetric percentage of chert in the selected zone.

Another aspect combinable with any of the previous aspects further includes receiving the first logging data from a logging tool in a wellbore formed through the selected zone of the first subterranean formation.

In another aspect combinable with any of the previous aspects, the logging tool includes a logging-while-drilling (LWD) tool.

The example implementation and aspects thereof may be implemented in systems, computer-implemented methods, and non-transitory computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

Implementations of methods and systems according to the present disclosure may include one or more of the following features. For example, methods and systems for determining an amount of chert in a subterranean formation may utilize conventional logging techniques to determine the amount of chert. Thus, the disclosed methods and systems may eliminate or help eliminate a need to have additional core samples of the subterranean formation studied at a laboratory to determine the amount of chert in the formation. Further, the disclosed methods and systems may determine an amount of more cost and time efficient thus saving time and money.

The details of one or more implementations of the subject matter described in this disclosure are set forth in the accompanying drawings and the description below. Implementations may be in the form of systems, methods, apparatus, and computer-readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. Features, aspects, and advantages of the subject matter will become apparent from the description, the drawings, and the claims.

DETAILED DESCRIPTION

Figure 1:
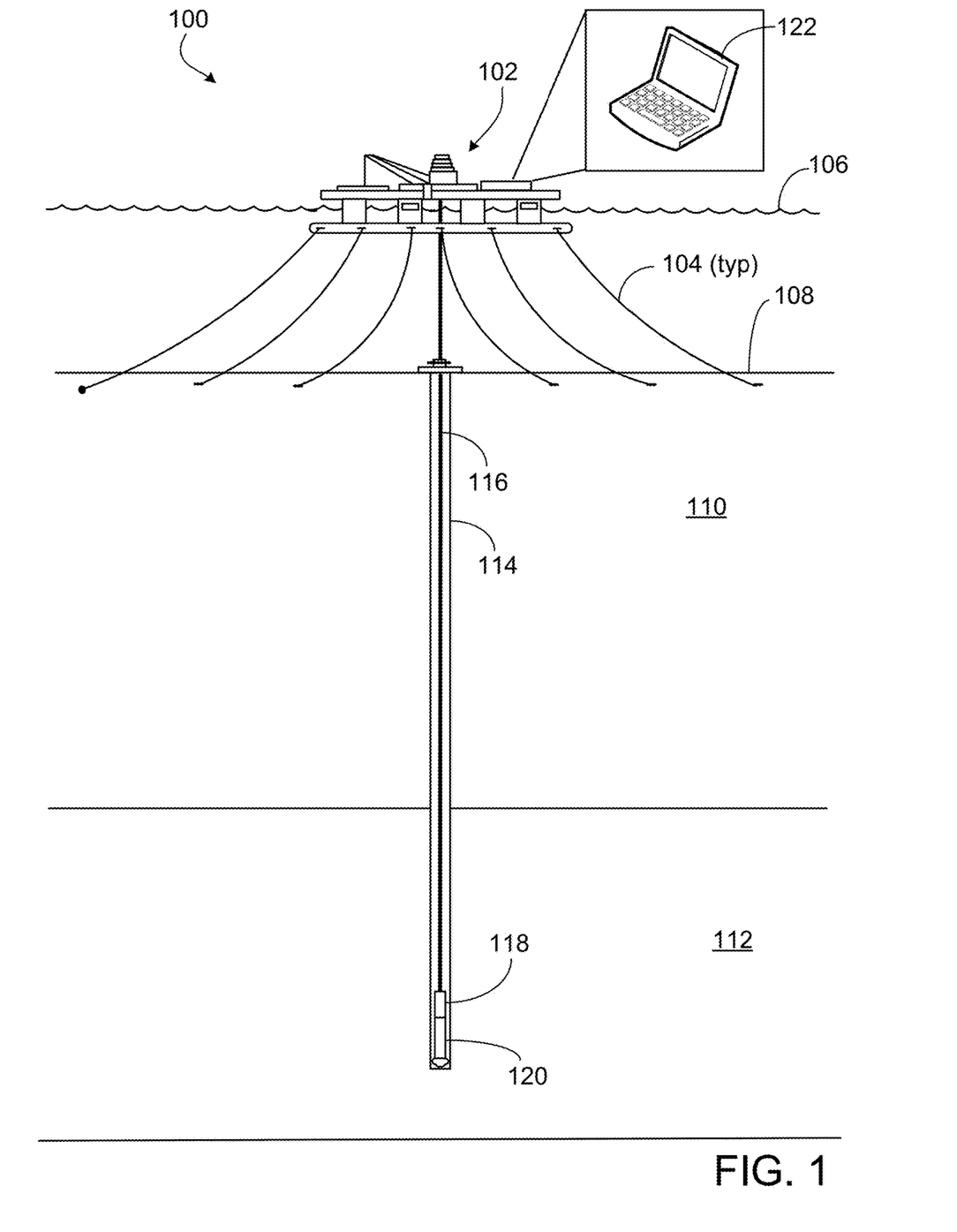
FIG. 1 is a schematic illustration of an example system for determining an amount of chert in a geological formation according to the present disclosure.

FIG. 1 is a schematic illustration of an example system 100 for determining an amount of chert in a geological formation. Generally, FIG. 1 illustrates a portion of one embodiment of the system 100 in which a logging tool, such as a logging tool 118, may generate or record logging data that is used to determine an amount of chert in a particular portion of a subterranean zone. In some cases, as shown in FIG. 1, the logging tool 118 is part of or coupled to a bottom hole assembly (BHA) 120 that includes a drilling bit or other wellbore formation tool (e.g., laser or otherwise). The generated or recorded logging data is used, in this example, by a control system 122 to calculate the amount of chert based at least in part on data that describes an amount of quartz and zircon within the particular geological formation.

In some aspects, system 100 may be used to quantify the amount of chert present in the particular geological formation based, at least in part, on geochemical volume ratio data derived from the logging data taken, e.g., within the system 100, in another wellbore system, or from another subterranean formation separate from a subterranean formation shown in FIG. 1. For instance, because chert is comprised of the same or very similar elemental composition as quartz, logging data, such as density, neutron, and gamma data may solely identify a presence of quartz within the formation, rather than chert and quartz as separate components. By utilizing a system such as system 100, the need to have core samples of the particular formation taken to determine the presence of chert may be reduced or eliminated.

As shown, the system 100 accesses a subterranean formation 110, and provides access to hydrocarbons located in such subterranean formation 110. In an example implementation of system 100, the system 100 may be used for a drilling operation in which the BHA 120 that includes a drilling bit may be used to form a wellbore 114 (e.g., with drill string 116, wireline, or otherwise) that extends through the subterranean formation 110 to a particular zone 112 of the formation 116. In another example implementation of system 100, the system 100 may be used for a completion, for example, hydraulic fracturing, operation, prior to which the logging tool 118 may be coupled to the drilling string 116 (or wireline) without the BHA 120.

As illustrated in FIG. 1, an implementation of the system 100 includes a drilling assembly 102 deployed on a terranean surface 12. The drilling assembly 102 may be used to form the wellbore 20 extending from a subsea surface 108 and through one or more geological formations in the Earth. One or more subterranean formations, such as subterranean zone 110, are located under the subsea surface 108.

In this example implementation, the drilling assembly 102 is deployed on a body of water 106 (e.g., ocean, gulf, sea) rather than a terranean surface. The drilling assembly 102, in this figures, is shown as a semi-submersible that floats on the body of water 106 while being anchored to the subsea surface 108 with one or more tethers 104. However, the present disclosure contemplates that the drilling assembly 102 can also be a drillship, drilling rig, or other drilling assembly either on a body of water or a terranean surface. In short, the present disclosure contemplates that the system 100 may be implemented on land and water surfaces and contemplates forming, developing, and completing one or more wellbores 114 from either or both locations.

In the example implementation of the system 100, the wellbore 114 is an open hole completion (e.g., without casing). The illustrated logging tool 118 (with or without the BHA 120) may traverse the wellbore 114 (e.g., from the subsea surface 108 to a bottom of the wellbore 115 within or past the zone 112 of the subterranean formation 110. Generally, the logging tool 118 (which may be a logging-while-drilling (LWD) tool) measure properties of the geological formation of the subterranean zone 110 while traversing the wellbore 114. Properties include, for example, resistivity, porosity, sonic velocity, gamma ray, and other properties which can define the characteristics of the formation, such as type of rock. For instance, the logging tool 118 can detect rock morphology (e.g., type of rock) according to certain properties, such as, for example, density, to distinguish between quartz and zircon in the subterranean formation 110 and, more particularly, the selected zone 112 of the formation 110. As noted, however, rock properties may not distinguish chert from quartz given these similarity of the elemental composition of these two rocks.

As shown, the drilling assembly 102 (or other portion of the system 100) includes a control system 122, for example, microprocessor-based, electro-mechanical, or otherwise, that may receive measured logging data from the logging tool 118 (or may identify previously recorded and stored logging data associated with the subterranean formation 110 and selected zone 112. In some aspects, the control system 122 may receive a continual or semi-continual stream of logging data from the logging tool 118 and, in some aspects, adjust the BHA 120 based on a determined amount of chert in the zone 112 of the subterranean formation 110. In some aspects, the control system 122 may receive a continual or semi-continual stream of logging data from the logging tool 118 and, in some aspects, recommend actions to take for drilling or completion operations in the wellbore 114 based on the determined amount of chert in the zone 112 of the subterranean formation 110.

The control system 122 may store (e.g., at least transiently) the logging data from the logging tool 118 in a computer-readable media that is communicably coupled to or a part of the system 122. The control system 122 may also store normalized logging data that has been taken (or previously taken) from a subterranean formation that is different from the subterranean formation 110. For example, the normalized logging data may be logging data from nearby (e.g., the wellbore 114 or formation 110) non-related formations. In the illustrated example, for instance, the normalized logging data may be from a subterranean formation that has a different source rock from the subterranean formation 110. Further, in the illustrated example, for instance, the normalized logging data may be from a subterranean formation that is not a marine depositional environment but rather, is located under a terranean surface as opposed to a subsea surface. In some aspects, subterranean formation 110 may be a Qusaiba shale formation which is comprised, among other rocks, of quartz, chert, and zircon minerals. Thus, normalized logging data may be logging data from a formation that is different or distinct from a Qusaiba shale formation.

Figure 2:
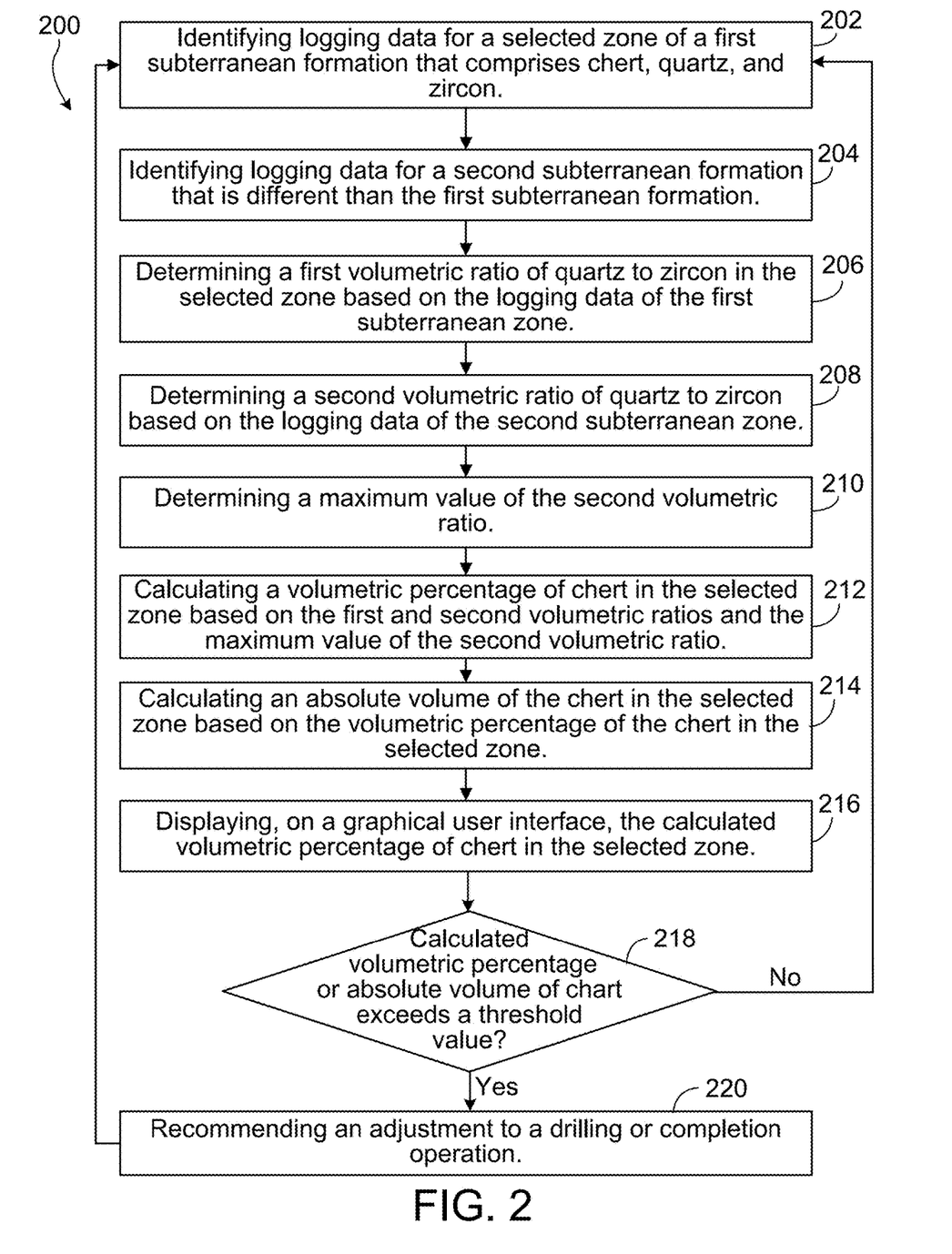
FIG. 2 is a flowchart that illustrates an example method for determining an amount of chert in a geological formation according to the present disclosure.

FIG. 2 is a flowchart that illustrates an example method 200 for determining an amount of chert in a geological formation. In some aspects, method 200 may be performed with or by the system 100 shown in FIG. 1. Method 200 begins at step 202, which includes identifying logging data for a selected zone of a first subterranean formation that comprises chert, quartz, and zircon. For example, as described, the subterranean formation 110 may be a formation, such as a Qusaiba shale formation, that is comprised of chert, quartz, and zircon (e.g., according to known morphology). The identified logging data, which may be stored or previously stored, or received directly from a logging tool within a wellbore, may provide (e.g., by density measurements), a volumetric log of the quartz in the formation (e.g., according to depth) as well as a volumetric log of the zircon in the formation (e.g., according to depth). For instance, turning briefly to FIG. 3, graph 300 illustrates logging data and calculated values used in the example method 200. Column 302 includes log 312 that shows an amount of quartz by volume (according to depth) in the subterranean formation, which includes a selected zone of the formation (e.g., zone 112 of formation 110). Column 304 includes log 314 that shows an amount of zircon by volume (according to depth) in the subterranean formation, which includes the selected zone of the formation (e.g., zone 112 of formation 110).

Method 200 continues at step 204, which includes identifying logging data for a second subterranean formation that is different than the first subterranean formation. For example, as described, normalized logging data may be taken from a subterranean formation that is different (e.g., different known morphology, different location, etc.) from the selected subterranean formation and selected zone within the formation.

Figure 3:
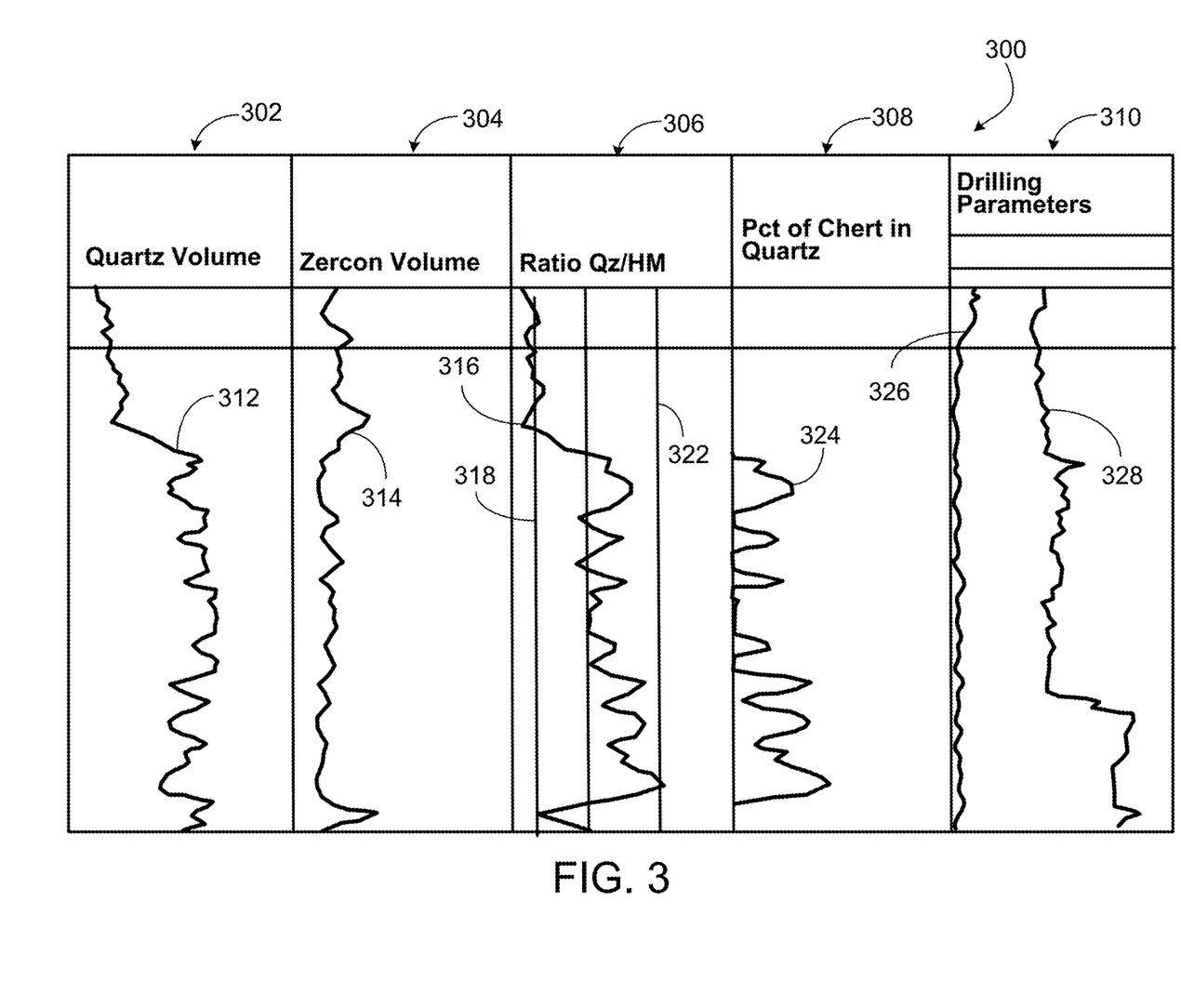
FIG. 3 is a graph that illustrates logging data and calculated values used in the example method of FIG. 2.

Method 200 continues at step 206, which includes determining a first volumetric ratio of quartz to zircon in the selected zone based on the logging data of the first subterranean zone. For example, as shown in FIG. 3, column 306 shows a quartz to zircon volume ratio log 316 according to depth in the wellbore. This ratio can be calculated, for example, according to logs 312 and 314, which show quartz volume and zircon volume, respectively, according to depth in the wellbore from which the logging data originated.

Method 200 continues at step 208, which includes determining a second volumetric ratio of quartz to zircon based on the logging data of the second subterranean zone. For example, the normalized logging data, much like the logging data from the first subterranean zone shown in FIG. 3, can include quartz and zircon volume logs according to depth, which can be used to develop a quartz to zircon volume ratio for the unrelated subterranean formation. FIG. 3 shows the normalized quartz to zircon volume ratio log 318 in volume 306. In some aspects, the log 318 represents a zero or "no chert" line that can be used as a scale ratio for the quartz to zircon volume ratio log 316. For example, in some aspects, the log 318 may be used to identify a background response of the subterranean formation to be drilled (or already drilled). The second volumetric ratio (e.g., log 318) can be determined by selecting an average quartz to zircon ratio reading of subterranean formations that are not within the selected formation (e.g., formation 110) and selected zone (e.g., zone 112) of the formation. In some aspects, such independent subterranean formations are not within marine depositional environments or include a particular source rock hydrocarbon bearing formation, such as, in this example, Qusaiba shale.

Method 200 continues at step 210, which includes determining a maximum value of the second volumetric ratio. For example, the maximum value of the second volumetric ratio can be determined by maximizing the normalized quartz to zircon volume ratio for the unrelated subterranean formation based on the normalized logging data.

Method 200 continues at step 212, which includes calculating a volumetric percentage of chert in the selected zone based on the first and second volumetric ratios and the maximum value of the second volumetric ratio. In some aspects, the volumetric percentage of chert in the selected zone (e.g., for the Qusaiba source rock formation) is based on the equation:

$$P_{chert} = \frac{R_{zone} - R_{Baseline}}{R_{max}},$$

where $P_{chert}$ is the volumetric percentage of the chert (shown in FIG. 3 as log 324 in column 308) n the selected zone, $R_{zone}$ is the first volumetric ratio, $R_{Baseline}$ is the second volumetric ratio, and $R_{max}$ is the maximum value of the second volumetric ratio.

Method 200 continues at step 214, which includes calculating an absolute volume of the chert in the selected zone based on the volumetric percentage of the chert in the selected zone. For example, the absolute volume of the chert in the selected zone can be determined by multiplying the volumetric percentage of the chert in the selected zone determined in step 212 by the volume of quartz in the selected zone (e.g., log 312).

Method 200 continues at step 216, which includes displaying, on a graphical user interface, the calculated volumetric percentage of chert in the selected zone. For example, in some aspects, the graphical display 300 may be displayed to the user, e.g., in real-time during logging or logging-while-drilling, or subsequent to these operations.

Method 200 continues at step 218, which includes a determination of whether a calculated volumetric percentage or absolute volume of chert exceeds a threshold value. For example, in some aspects, a driller or other entity associated with drilling and/or completion of a hydrocarbon well may desire to avoid drilling or completing (e.g., fracturing) through chert when possible. For instance, the presence of chert in the subterranean formation and selected zone (e.g., for production/completion operations) may affect the drilling and, in some cases, a horizontal well placement. When planning horizontal wells across a formation that includes chert, penetration through the formation (e.g., up, down, across) may be difficult and require several bit changes to complete the drilling due to the hardness of chert. As for completion operations, such as hydraulically fracturing, unconventional or tight formations that contain a high volumetric ratio of chert may be difficult to break or fracture with an acceptably high fracture efficiency. Further, any fracture growth may be limited once it hits the chert in the formation or zone. Thus, during drilling and completion operations, it may be preferable to avoid a subterranean formation or selected zone that includes chert in a volumetric percentage above a predetermined threshold.

FIG. 3, for instance, shows effects that the presence of chert may have on drilling properties, such as rate of penetration (ROP) and weight on bit (WOB). Column 310 shows drilling properties of an example drilling operation through the first subterranean formation, including a ROP log 326 and WOB log 328. As illustrated in column 310, although the ROP stays fairly constant in the presence of chert (shown by log 324), the WOB increases with increasing amounts of chert in the subterranean formation. Thus, the drilling operation is less efficient (e.g., more WOB is required to drill at the same ROP) in the presence of increasing volumetric ratios of chert within the subterranean formation.

Method 200 continues at step 220, which includes recommending an adjustment to a drilling or completion operation based on the calculated volumetric percentage of the chert. For example, with knowledge of the volumetric ratio of chert, recommendations may be made to, e.g., drill in other locations or depths, abandon a drilling operation or fracturing operation, relocate a fracturing operation so that the chert is not between the wellbore and the hydrocarbon bearing selected zone of the subterranean formation.

Figure 4:
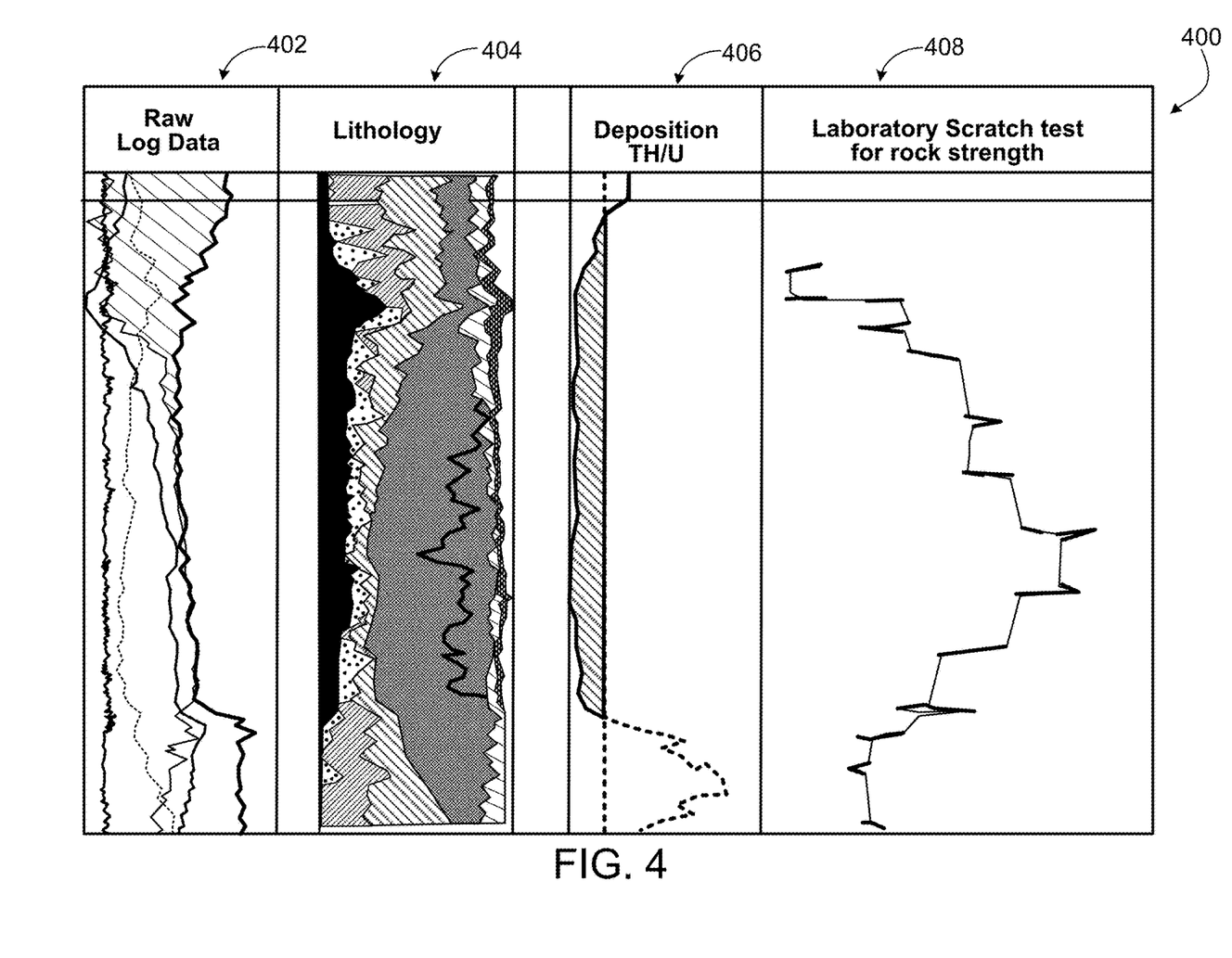
FIG. 4 is a graph that illustrates rock strength measurements using a scratch test performed on a core sample of a rock formation that contains chert used in a laboratory test to confirm the example method of FIG. 2.

FIG. 4 is a graph that illustrates rock strength measurements using a scratch test performed on a core sample of a rock formation that contains chert used in a laboratory test to confirm the example method of FIG. 2. For example, the accuracy of the results of method 200 were evaluated by using data from labs and field to validate the methodology of determining an amount of chert according to FIG. 2 and the present disclosure. For example, core samples from different wells in a Qusaiba source rock formation were evaluated in labs. The laboratory measurement of rock strength showed high rock strength values across the zones with chert. Uniaxial compressive strength and laboratory scratch tests show abnormally hard rock in chert formations which also included organic matter, sandstone, carbonates, and different types of clays.

The chart 400 of FIG. 4 shows the results of these laboratory tests on the core samples from the Qusaiba formation. Chart 400 includes raw log data 402, which shows, over a depth of a wellbore from which the core samples were taken. The raw log data 402 shows logging data (e.g., density, neutron and gamma ray) from the source formation. The lithology log 404 shows the formation composition; in this case, a clastic formation with source rock (kerogen) content including other minerals of quartz, chert, illite, chlorite, kaolinite, calcite and albite. Chart 400 also includes a deposition thorium-uranium 230 dating ("TH/U") log 406, which is shown here to indicate that the source formation is a marine depositional environment. For example, TH/U data can show an age of calcium carbonate materials such as speleothem or coral in a marine depositional environment. Finally, chart 400 includes a rock strength log 408 which shows the results of laboratory scratch test rock strength of the source formation core samples. As shown in chart 400, and the rock strength log 408 in particular, although the raw log data 402 does not indicate any major changes across the formation which includes chert, the rock strength log 408 indicates (through a greater rock strength indication) chert in the formation.

Figure 5:
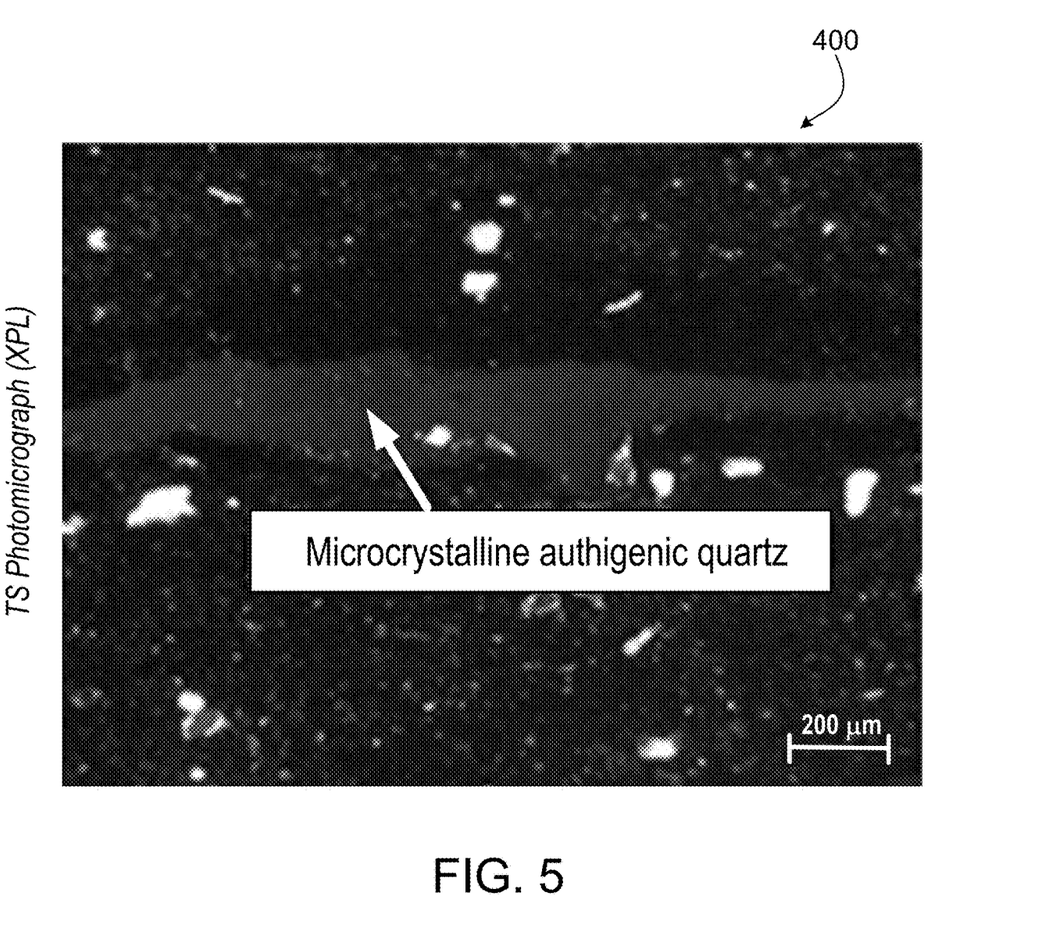
FIG. 5 is a photomicrograph of a source rock formation that contains chert that illustrates a laboratory test to confirm the example method of FIG. 2.

FIG. 5 is a photomicrograph 500 of a source rock formation that contains chert that illustrates a laboratory test to confirm the example method of FIG. 2. For example, the photomicrograph 500 was taken of a core sample of the Qusaiba formation to detect a presence of chert in the formation, even though logging data (which did not distinguish between quartz and chert) did not show the presence of chert in the samples. The photomicrograph 500, as highlighted in the callout box, shows the presence of a microcrystalline authigenic quartz layer in the core sample (from a formation in which chert was quantified using method 200). In some aspects, the presence of the microcrystalline authigenic quartz layer is an indication of chert in the formation.

Figure 6:
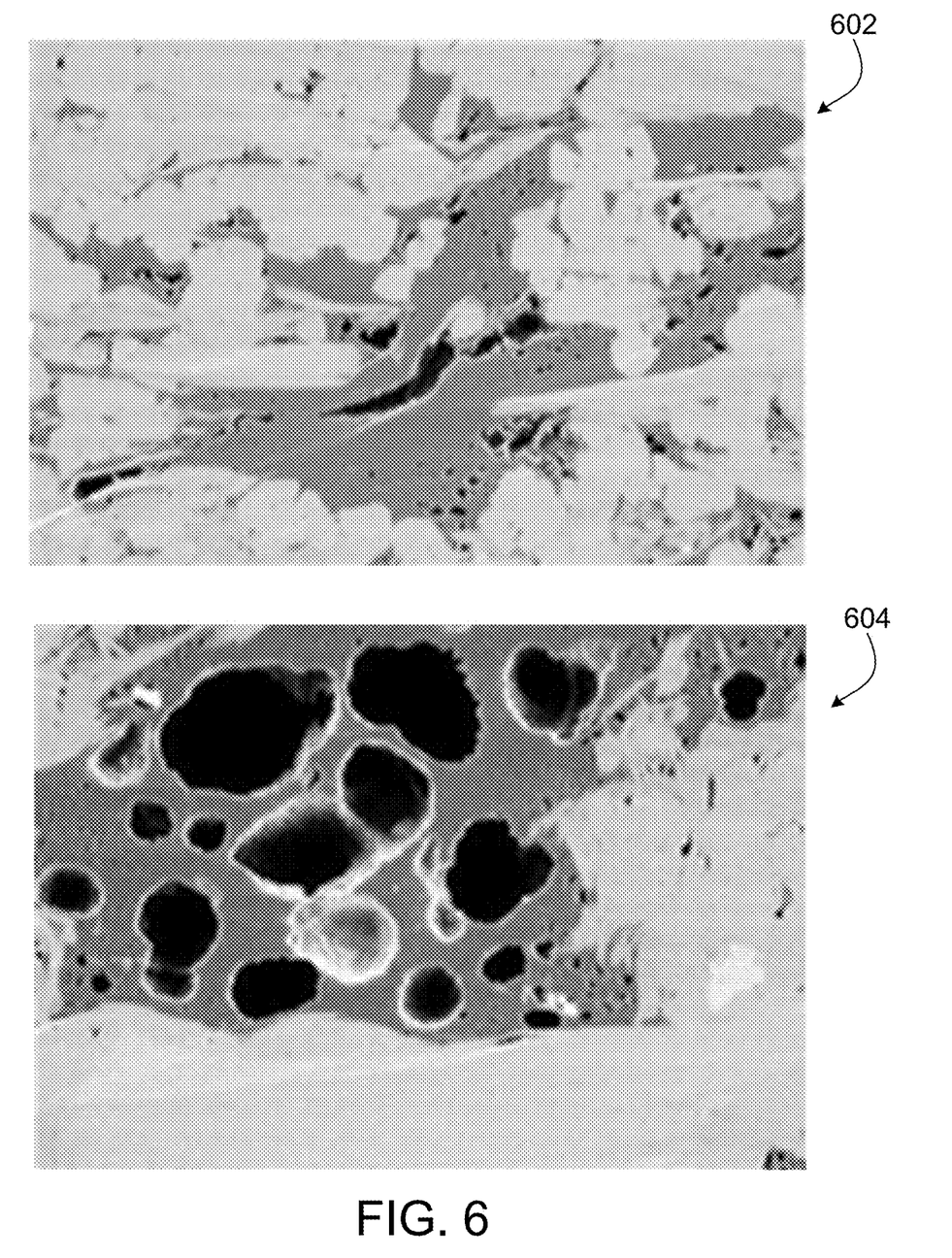
FIG. 6 illustrates focus ion beam and scanning electron microscopy images from samples of a rock formation that contains chert used in a laboratory test to confirm the example method of FIG. 2.

FIG. 6 illustrates focus ion beam and scanning electron microscopy images 602 and 604 from samples of a rock formation that contains chert used in a laboratory test to confirm the example method of FIG. 2. For example, the images 602 and 604 were taken of core samples of the Qusaiba formation to detect a presence of chert in the formation. The images 602 and 604 were taken from two core samples from the same well formed in the same subterranean formation. Image 602 is of a core sample from a shallower portion of the wellbore relative to a core sample shown in the image 604. The image 602 shows that the shallower core sample had crushed pores (shown as black portions of the image) due to an overburden and small matrix support. The image 604 shows that the deeper sample has chert identified, and the chert, as a known high strength rock, protected the pores (circular shaped black portions) from being crushed. Indeed, image 604 shows almost perfect circular pores surrounded by chert, which gave the rock matrix support against the overburden and prevented the pores from being crushed in the organic matter.

Figure 7:
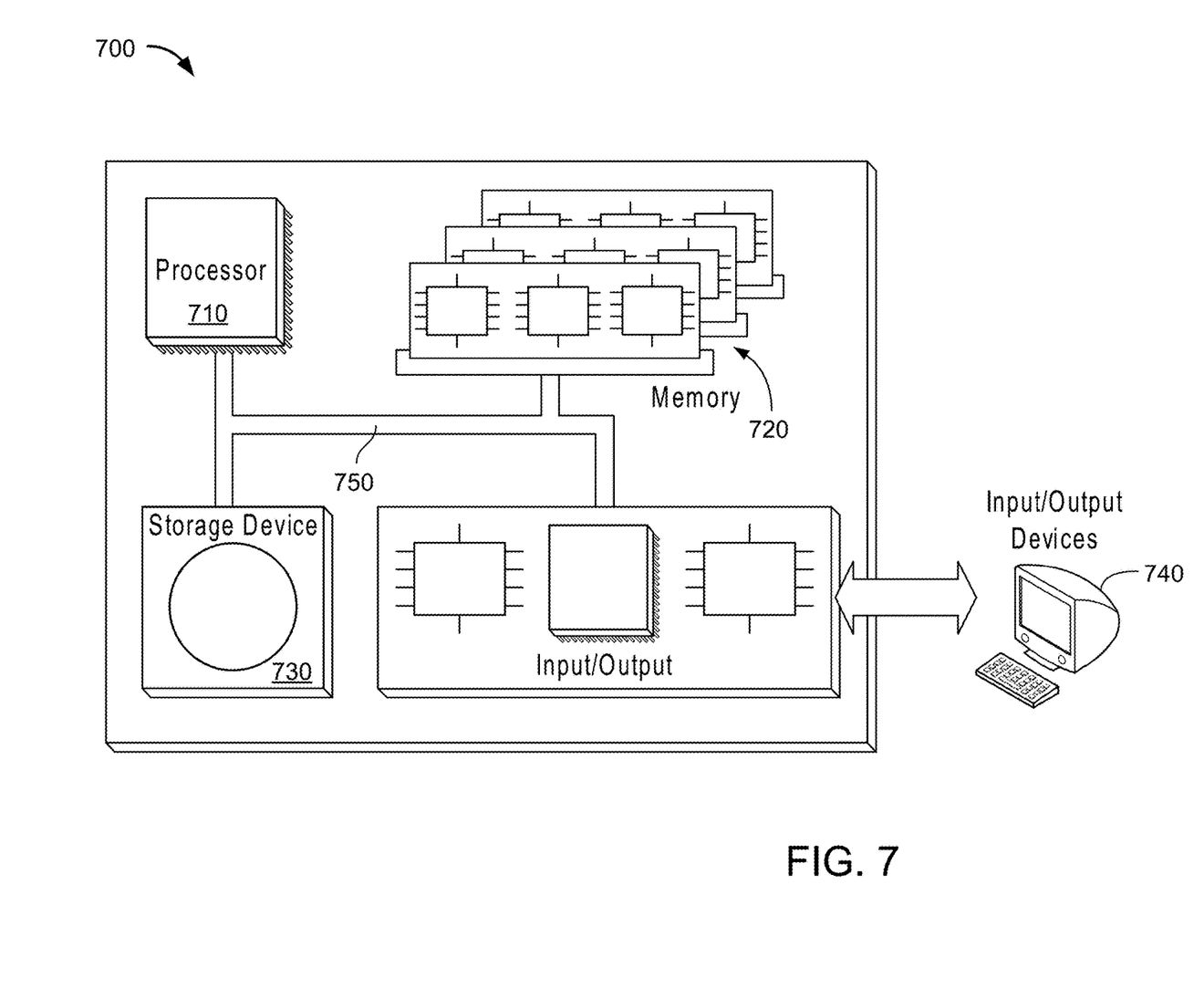
FIG. 7 illustrates a schematic diagram of a computing system for a computer-implemented method for an image-based analysis of the geological thin section.

FIG. 7 illustrates a schematic diagram of a computing system for a computer-implemented method such as method 200 shown in FIG. 2. The system 700 can be used for the operations described in association with any of the computer-implemented methods described previously, for example as the control system 122 that is included within the wellbore system 100 shown in FIG. 1.

The system 700 is intended to include various forms of digital computers, such as laptops, desktops, workstations, personal digital assistants, servers, blade servers, mainframes, and other appropriate computers. The system 700 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. In some implementations, the control modules herein may not include a memory module 720.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor, and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, and/or processes described herein may include more steps or fewer steps than those described. Further, the steps in such example operations, methods, and/or processes may be performed in different successions than that described or illustrated in the figures. Accordingly, other implementations are within the scope of the following claims.

What is claimed is:

1. A computer-implemented method for determining an amount of chert in a rock formation, comprising:
    identifying first logging data for a selected zone of a first subterranean formation that comprises chert, quartz, and zircon;
    identifying second logging data for a second subterranean formation that is different than the first subterranean formation, the second subterranean formation comprising chert, quartz, and zircon;
    determining a first volumetric ratio of quartz to zircon in the selected zone based on the first logging data;
    determining a second volumetric ratio of quartz to zircon based on the second logging data;
    determining a maximum value of the second volumetric ratio; and
    calculating, based on the first and second volumetric ratios and the maximum value of the second volumetric ratio, a volumetric percentage of chert in the selected zone.

2. The computer-implemented method of claim 1, further comprising:
    calculating an absolute volume of the chert in the selected zone based on the volumetric percentage of the chert in the selected zone.

3. The computer-implemented method of claim 2, wherein calculating the absolute volume of the chert in the selected zone comprises:
    determining a total volume of the quartz in the selected zone; and
    multiplying the volumetric percentage of the chert in the selected zone by the total volume of the quartz in the selected zone.

4. The computer-implemented method of claim 1, wherein the first subterranean formation comprises a marine deposition subterranean environment, and the second subterranean formation comprises a non-marine deposition subterranean environment.

5. The computer-implemented method of claim 1, wherein calculating, based on the first and second volumetric ratios and the maximum value of the second volumetric ratio, a volumetric percentage of the chert in the selected zone comprises solving the equation:

$$P_{chert} = \frac{R_{zone} - R_{Baseline}}{R_{max}},$$

where $P_{chert}$ is the volumetric percentage of the chert in the selected zone, $R_{zone}$ is the first volumetric ratio, $R_{Baseline}$ is the second volumetric ratio, and $R_{max}$ is the maximum value of the second volumetric ratio.

6. The computer-implemented method of claim 1, wherein the selected zone comprises a Qusaiba geological formation.

7. The computer-implemented method of claim 1, further comprising displaying, on a graphical user interface, the calculated volumetric percentage of chert in the selected zone.

8. The computer-implemented method of claim 7, wherein displaying the calculated volumetric percentage of chert in the selected zone comprises displaying the calculated volumetric percentage of chert as a function of depth between a shallowest depth of the selected zone and a deepest depth of the selected zone.

9. The computer-implemented method of claim 1, further comprising recommending an adjustment to a drilling or completion operation based at least in part on the calculated volumetric percentage of chert in the selected zone.

10. The computer-implemented method of claim 1, further comprising receiving the first logging data from a logging tool in a wellbore formed through the selected zone of the first subterranean formation.

11. The computer-implemented method of claim 10, wherein the logging tool comprises a logging-while-drilling (LWD) tool.

12. A system, comprising:
    one or more hardware processors; and
    one or more memory modules that store instructions executable by the one or more hardware processors to perform operations comprising:
        identifying first logging data for a selected zone of a first subterranean formation that comprises chert, quartz, and zircon;
        identifying second logging data for a second subterranean formation that is different than the first subterranean formation, the second subterranean formation comprising chert, quartz, and zircon;
        determining a first volumetric ratio of quartz to zircon in the selected zone based on the first logging data;
        determining a second volumetric ratio of quartz to zircon based on the second logging data;
        determining a maximum value of the second volumetric ratio; and
        calculating, based on the first and second volumetric ratios and the maximum value of the second volumetric ratio, a volumetric percentage of chert in the selected zone.

13. The system of claim 12, wherein the operations further comprise:
    calculating an absolute volume of the chert in the selected zone based on the volumetric percentage of the chert in the selected zone.

14. The system of claim 13, wherein calculating the absolute volume of the chert in the selected zone comprises:
    determining a total volume of the quartz in the selected zone; and
    multiplying the volumetric percentage of the chert in the selected zone by the total volume of the quartz in the selected zone.

15. The system of claim 12, wherein the first subterranean formation comprises a marine deposition subterranean environment, and the second subterranean formation comprises a non-marine deposition subterranean environment.

16. The system of claim 12, wherein calculating, based on the first and second volumetric ratios and the maximum value of the second volumetric ratio, a volumetric percentage of the chert in the selected zone comprises solving the equation:

$$P_{chert} = \frac{R_{zone} - R_{Baseline}}{R_{max}},$$

where $P_{chert}$ is the volumetric percentage of the chert in the selected zone, $R_{zone}$ is the first volumetric ratio, $R_{Baseline}$ is the second volumetric ratio, and $R_{max}$ is the maximum value of the second volumetric ratio.

17. The system of claim 12, wherein the selected zone comprises a Qusaiba geological formation.

18. The system of claim 12, wherein the operations further comprise displaying, on a graphical user interface, the calculated volumetric percentage of chert in the selected zone.

19. The system of claim 18, wherein displaying the calculated volumetric percentage of chert in the selected zone comprises displaying the calculated volumetric percentage of chert as a function of depth between a shallowest depth of the selected zone and a deepest depth of the selected zone.

20. The system of claim 12, wherein the operations further comprise recommending an adjustment to a drilling or completion operation based at least in part on the calculated volumetric percentage of chert in the selected zone.

21. The system of claim 12, further comprising a logging tool communicably coupled with the one or more hardware processors, and the operations further comprise receiving the first logging data from the logging tool in a wellbore formed through the selected zone of the first subterranean formation.

22. The system of claim 21, wherein the operations further comprise receiving the first logging data from the logging tool during the formation of the wellbore through the selected zone of the first subterranean formation.

* * * * *